July 25, 1944.  E. B. PECK  2,354,540
PROCESS FOR THE PRODUCTION OF PHYSIOLOGICALLY INERT OIL
Filed Oct. 31, 1940
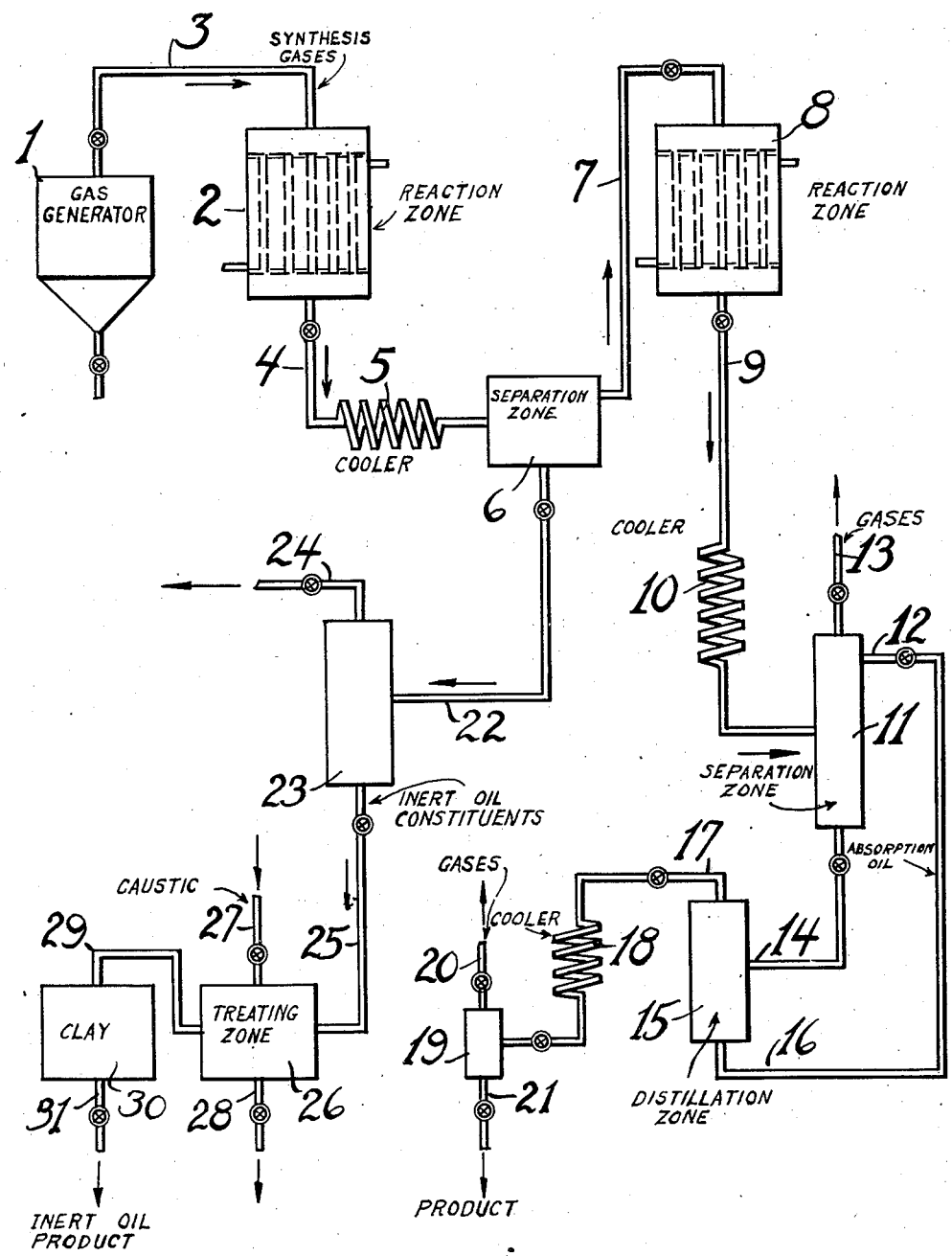
Edward B. Peck Inventor
By ... Young Attorney Patented July 25, 1944

2,354,540

UNITED STATES PATENT OFFICE 2,354,540

PROCESS FOR THE PRODUCTION OF PHYSIOLOGICALLY INERT OILS

Edward B. Peck, Elizabeth, N. J., assignor, by mesne assignments, to Standard Catalytic Company, a corporation of Delaware Application October 31, 1940, Serial No. 363,643

5 Claims. (Cl. 260—449.6)

The present invention is concerned with the manufacture of valuable hydrocarbon products by the hydrogenation of oxides of carbon. The invention is more particularly concerned with the control of operations of this character for the production of substantially aromatic free and physiologically inert products which are particularly adapted for human use in the form of cosmetics, medicinal oils and the like. In accordance with the present invention, products of this character are prepared by the hydrogenation of oxides of carbon utilizing a particular catalyst under controlled conditions which are adapted to produce relatively high yields of physiologically inert oil products.

It is well known in the art to prepare physiologically inactive oils having no aromatic constituents by various procedures. One conventional method employed, for example, is to treat animal or vegetable oils or the fatty acids derived therefrom by hydrogenation or other methods that remove or change the carboxyl group or unsaturated active groups to inert saturated groups. This procedure is not particularly satisfactory since yields are low and the operations are relatively expensive. It is also known in the art that hydrocarbon constituents containing more than one carbon atom in the molecule and various related oxygenated compounds may be obtained by reacting oxides of carbon with hydrogen at elevated temperatures and pressures in the presence of a suitable catalyst and under controlled temperature and pressure conditions. In these operations the conventional operation is conducted in the general temperature range from about 300° F. to about 410° F. In general the operation is so controlled that the predetermined operating temperature does not vary more than about 10° F. and is usually controlled so that the temperature variance does not exceed about 5° F. Pressures in the general range from about atmospheric to about 20 atmospheres are employed. In these operations a wide variety of catalysts may be employed, as for example cerium, chromium, cobalt, manganese, osmium, palladium, titanium, zinc, iron, and oxides or other compounds of these metals, as well as mixtures of the same. In operations of this character, commonly known as the Fischer or Fischer-Tropsch process, carbon monoxide and hydrogen, preferably in the ratio of one volume of carbon oxide to two volumes of hydrogen, are contacted at about atmospheric or moderate pressures at temperatures from about 360° F. to about 500° F. in contact with one of the above-named or equivalent catalysts at space velocity of 75 to 100 volumes of reacting gases, per volume of catalyst space, per hour.

The reaction is usually carried out in a series of reactors with intermediate zones adapted for the condensation of the products formed. The material condensing at atmospheric temperature is largely water and the higher boiling fractions of the oil. The relatively low boiling fractions of the oil, including most of the hydrocarbon constituents boiling in the motor fuel boiling range, are recovered by an absorption operation or by another suitable process.

In these operations the quality and character of the product produced varies considerably with the particular catalyst used as well as upon general operating conditions. When the catalyst comprises an iron catalyst, approximately 70% to 80% of the hydrocarbon product boils below 400° F., the constituents of which are highly alkyl branched-chain compounds comprising about 60% olefins. When employing a ruthenium catalyst, the product comprises about 75% to about 80% of high molecular weight saturated paraffins, and is substantially free of aromatic hydrocarbons.

Cobalt and nickel catalysts give intermediate quality products, those from nickel being most paraffinic, and those from cobalt most olefinic. The quality of the product may be somewhat altered by changing the ratio of carbon monoxide to hydrogen in the feed gases. For example, an increase in the hydrogen will increase the yields of saturated lower molecular weight products. On the other hand, cobalt and nickel catalysts produce small amounts of unsaturated hydrocarbons, as shown by the refractive index and the distillation-specific gravity relationships.

I have now found that a catalyst which consists of an alloy of nickel containing 10% of cobalt produced by first alloying with aluminum and subsequently dissolving out the aluminum by treatment with caustic, which when utilized in the hydrogenation of oxides of carbon produces a product, about 40% of which boils above 400° F. and which is free from aromatic hydrocarbons. Although the yields in employing this catalyst are smaller than those produced in conventional operations, the product contains substantially no constituents other than highly paraffinic physiological inert oil constituents. The particular fraction produced in this manner which is especially desirable as a physiological inert oil is that fraction which boils above about 400° F. and which is readily condensable with cooling water of about 70° F. at atmospheric pressures.

My invention may be readily understood by reference to the drawing illustrating one modification of the same. Feed gases comprising carbon monoxide and hydrogen are produced in generator 1 and introduced into synthesizing zone 2 by means of line 3. Synthesizing zone 2 is provided with suitable distributing, heating and cooling means. Zone 2 is also packed with a suitable catalyst which for the purpose of description is taken to be an alloy of nickel containing 10% cobalt. Operating temperatures are adjusted to produce hydrocarbon constituents containing more than one carbon atom in the molecule.

The reaction products are withdrawn from reaction zone 2 by means of line 4, passed through cooler 5 and introduced into separating zone 6. Unreacted constituents are removed from separating zone 6 by means of line 7 and passed into a second synthesizing zone 8. Synthesizing zone 8 is provided with suitable distributing, heating and cooling means. This zone is packed with a conventional catalyst and operating conditions are adjusted to secure the maximum yield of hydrocarbon constituents containing more than one carbon atom in the molecule. The reacted products are withdrawn from synthesizing zone 8 by means of line 9, passed through cooling zone 10 and introduced into separation zone 11 in which the synthesized products are separated from the unreacted gases.

For purposes of description it is assumed that this separation is secured by means of an oil absorption operation. The absorption oil is introduced in the upper part of separation zone 11 by means of line 12 and flows downwardly contacting the upflowing gases under conditions to absorb therein the desired constituents. The vaporous undissolved gases are removed overhead from separation zone 11 by means of line 13 and handled or further treated in any manner desirable. The absorption oil containing dissolved therein the desired hydrocarbon constituents is removed from separation zone 11 by means of line 14 and passed into distillation zone 15 in which the dissolved hydrocarbon constituents are removed from the absorption oil. The absorption oil free of dissolved hydrocarbons is removed from distillation zone 15 by means of line 16 and recycled to absorption zone 11. The hydrocarbon constituents removed from the absorption oil are removed overhead from distillation zone 15 by means of line 17 introduced into cooler 18 and passed to separation zone 19. Uncondensed gases are removed from separation zone 19 by means of line 20 while the desired hydrocarbon product is removed by means of line 21 and further refined or handled in any manner desirable.

The product condensed in separation zone 6 comprises the desired physiologically inert oil which is removed by means of line 22 and introduced into separation zone 23 in which the relatively low boiling constituents are removed overhead by means of line 24 while the desired physiologically inert oil constituents are removed by means of line 25. This product is introduced into treating zone 26 in which it is contacted with an alkali metal hydroxide solution which for purposes of description is assumed to be a sodium hydroxide solution. Fresh sodium hydroxide solution is introduced into treating zone 26 by means of line 27 and the spent solution withdrawn by means of line 28. The treated oil is withdrawn from treating zone 26 by means of line 29 and passed into clay contacting or equivalent unit 30. The treated product comprising a highly refined, completely inert oil is withdrawn from contacting zone 30 by means of line 31 and handled as desired.

The process of the present invention may be widely varied. Usual Fischer synthesis operating conditions may be employed. The invention essentially comprises using a catalyst selected from the class consisting of a nickel-cobalt catalyst and a ruthenium catalyst. The amount of cobalt present in the nickel-cobalt catalyst is in the general range from about 5% to about 20% cobalt. Preferred results are, however, secured when the amount of cobalt present is about 10% based on the quantity of nickel. It is, however, to be understood that small quantities of other promoting substances may be present such as copper or an alkali as, for example, potassium carbonate. The ruthenium similarly may have present a small quantity of copper, the concentration of which is in the range from about 0.5% to about 5.0%.

In accordance with a preferred modification of the present invention, the synthesized product produced is subsequently distilled in order to segregate the constituents boiling above about 400° F. These constituents are treated preferably with an alkali metal hydroxide solution in order to remove fatty acids and other undesirable constituents. The alkali treated product is preferably contacted with clay in order to remove any olefin compounds which may be present.

In order to further illustrate my invention, the following example is given which should not be construed as limiting the same in any manner whatsoever.

*Example*

Feed gases comprising hydrogen and carbon monoxide were contacted with a nickel catalyst containing about 10% of cobalt at a temperature of about 400° F. and at about atmospheric pressure. The reaction products removed from the synthesizing zone were cooled to about atmospheric temperature and the condensate separated. The condensate was distilled in order to segregate constituents boiling above about 400° F. This product was contacted with an alkali metal hydroxide solution and clay treated. The resulting product had the following inspection:

Specific gravity _____ 0.735 at 20° F.
Pour point _____°F__ 45
Iodine number _____ 4.4
Olefin content _____per cent__ 4

The process of this invention is not to be limited by any theory or mode of operation but only by the following claims.

I claim:

1. The process for the production of highly paraffinic hydrocarbon oils of high boiling point which comprises passing two volumes of hydrogen with one volume of carbon monoxide over a skeleton alloy catalyst consisting of nickel and 5-20% cobalt with reference to the nickel at a temperature between 360° F. and 500° F., and at a pressure in the range from about atmospheric to about 20 atmospheres, segregating normally liquid hydrocarbons boiling about 400° F. and further purifying the same.

2. The process for the production of highly paraffinic hydrocarbon oils of high boiling point which comprises passing two volumes of hydrogen with one volume of carbon monoxide over a skeleton alloy catalyst consisting of nickel and 5-20% cobalt with reference to the nickel at a temperature between 360° F. and 500° F., and at a pressure in the range from about atmospheric to about 20 atmospheres, segregating normally liquid hydrocarbons boiling above 400° F., and treating said hydrocarbons with an alkaline solution and clay.

3. The process for producing a maximum yield of hydrocarbon constituents containing more than one carbon atom in the molecule and for the production of highly paraffinic hydrocarbon oils of high boiling point by the hydrogenation of oxides of carbon, which comprises passing two volumes of hydrogen with one volume of carbon monoxide in an initial stage at a temperature in the range from about 360° F. to about 500° F. at a pressure in the range from about 1 to about 20 atmospheres over a skeleton alloy catalyst consisting of nickel and 5-20% cobalt with reference to the nickel, separating the reaction products and cooling the same whereby a condensate separates, removing said condensate comprising highly paraffinic hydrocarbon oils of high boiling point and passing the cooled gases to a secondary stage, and further reacting said gases in said secondary stage in the presence of a synthesizing catalyst under conditions to secure a maximum yield of hydrocarbon constituents containing more than one carbon atom in the molecule.

4. Process according to claim 1 in which said alloy catalyst consists of nickel containing about 10% of cobalt alloyed therewith.

5. Process in accordance with claim 3, in which said alloy catalyst employed in said initial stage consists of nickel containing about 10% of cobalt alloyed therewith.

EDWARD B. PECK.